April 25, 1933.  J. H. OLIVER  1,905,741
STORAGE BATTERY VOLTAGE REGULATOR
Filed Jan. 2, 1931
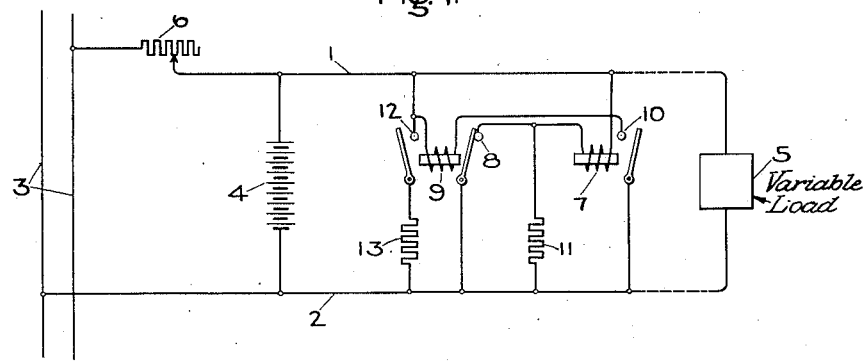
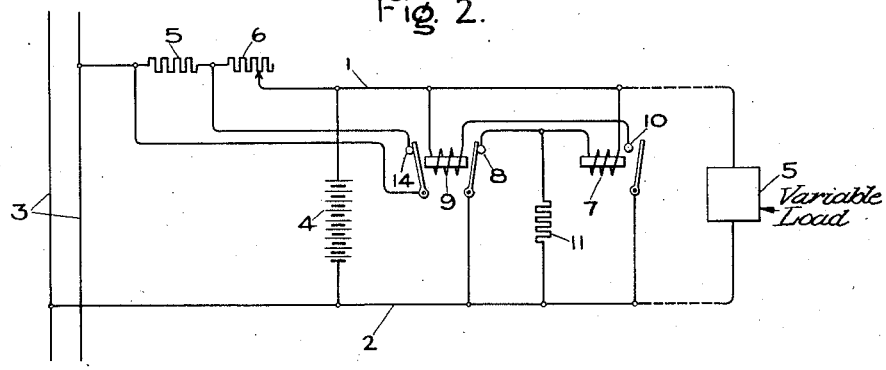
Inventor:
James H. Oliver,
by Charles E. Tullo
His Attorney.

Patented Apr. 25, 1933

1,905,741

UNITED STATES PATENT OFFICE

JAMES H. OLIVER, OF ALDAN, PENNSYLVANIA, ASSIGNOR TO GENERAL ELECTRIC COMPANY, A CORPORATION OF NEW YORK

STORAGE BATTERY VOLTAGE REGULATOR

Application filed January 2, 1931. Serial No. 506,184.

My invention relates to the control of the voltage of electric storage batteries and more particularly to the automatic control of the voltage of storage batteries which are continuously floated across a circuit in order to act as a stand by source of energy as well as to aid the main source of current supply during peak loads on the circuit.

There are many direct current circuits in which the necessity and importance of an unfailing source of supply current, or the desirablility of having an auxiliary source of current supply for aiding a main source of current supply during peak loads, or both, require that a storage battery be continuously floated across the circuit. Typical examples of such circuits are found in the control circuits in automatic substations and also the control circuits for supervisory control systems. In automatic substations, for example, there are many devices such as contactors and circuit breakers which require a reliable source of direct current for their operation. This current is usually supplied by any suitable source such as a supply bus which is energized by a small direct current generator. In such stations the peak load on the source of control current occurs relatively infrequently and is considerably greater in magnitude than the average load on this source. For this reason it is uneconomical to have a main source of control current which has a rating equal to the peak load on this source. It is therefore customary to float a storage battery across such a source, or across the control circuit itself, and to have the main source of control current have a rating substantially equal to the average load.

The operation of such an arrangement under normal conditions is such that the voltage of the main source of current supply is high enough to cause a small charging current to flow through the battery, this current being just sufficient to keep the battery fully charged. Under abnormally light load conditions the voltage across the battery will go up due to the fact that the voltage drop in the circuit between the main source and the battery has decreased due to the decrease in load current. The result is that the battery is likely to be injured through overcharging, provided that this condition lasts long enough. During overload conditions the increase in voltage drop in the conductors between the battery and the main source of current supply is so great the the battery voltage becomes higher than the voltage of the main source with respect to the load with the result that the extra current supply needed for the extra large load is supplied by the battery. If this condition persists for a long enough time the battery is likely to become discharged with the result that the safety feature of a stand by source is lost.

In accordance with my invention I provide means responsive to the voltage of a storage battery which is floated across a control circuit, for varying the voltage drop in the circuit conductors between the battery and the main source of current supply in such a manner as to maintain the battery voltage within predetermined limits.

An object of my invention is to provide means for regulating the voltage of storage batteries which are floated across control circuits.

Another object of my invention is to provide a simple and inexpensive means for regulating the voltage of a storage battery which is floated across a variable load circuit in order to provide a reliable stand by source of current for the load connected to said circuit.

My invention will be better understood from the following description taken in connection with the accompanying drawing and its scope will be pointed out in the appended claims.

In the drawing, Fig. 1 illustrates diagrammatically an embodiment of my invention in which the voltage regulation is secured by varying the magnitude of the voltage drop between the storage battery and the main source of current supply by controlling an auxiliary load connected across the control circuit, while Fig. 2 illustrates a modification in which the voltage drop for regulating purposes is secured by varying the magnitude of the resistance of the circuit connections between the storage battery and the main source of current supply.

Referring now to Fig. 1, reference characters 1 and 2 designate the conductors of a direct current control circuit which has connected thereto a substantially constant voltage source of direct current, shown as supply bus 3, a storage battery 4, and a variable load 5, which may be one or more independently operated devices such as circuit breakers, contactors, etc. An adjustable resistance 6 is connected in the control circuit between the constant voltage source and the storage battery 4 for adjusting the charging rate of the storage battery.

The voltage regulating means for storage battery 4 comprises a voltage responsive device having an operating element such as a coil 7, connected across the control circuit through the contacts 8 of a second voltage responsive device whose operating coil 9 may be connected across the control circuit through the contacts 10 of the first voltage responsive device. A resistance 11 is connected in parallel with the contacts 8 of the second voltage responsive device so that regardless of whether the contacts 8 are open or closed some current will always flow through the coil 7. Operating coil 9 has associated therewith a second set of contacts 12, which when closed serve to connect a resistance or artificial load 13 across the control circuit.

The operation of the embodiment of my invention illustrated in Fig. 1 is as follows: Assume that a constant voltage is maintained across a supply bus 3 and that the load 5 is drawing less current than it usually does. Under these circumstances the voltage of battery 4 will gradually rise because as the load is light the voltage drop between the battery and the charging source will be low with the result that a higher voltage is impressed across the battery thus increasing the charging rate. When a predetermined voltage is reached the coil 7 will be sufficiently energized to close contacts 10 thus connecting coil 9 across the control circuit. If the load conditions remain the same the voltage of the battery will continue to increase until at a predetermined high voltage the coil 9 will become sufficiently energized to cause contacts 8 to open and contacts 12 to close. The result of the closure of contacts 12 will be to connect artificial load 13 across the control circuit. This will cause an increase in current to flow through the conductors 1 and 2 and also to flow through the resistance 6 with the result that an increase in voltage drop takes place in these conductors so that the charging rate of the battery is decreased. If desired the battery may even be made to discharge. The effect of opening contacts 8 is to connect resistance 11 in series with winding 7 so that the current in this winding is reduced to a point where magnet 7 can little more than hold contacts 10 closed. If now the voltage of the battery 4 decreases through the effect of artificial load 13 or because load 5 has increased, a predetermined low voltage value will be reached at which contacts 10 will open thus breaking the energizing circuit for magnet 9 with the result that contacts 8 and 12 are restored to their original positions. The above cycle of operations will then be repeated indefinitely at a rate depending upon how load 5 fluctuates.

Resistance 11 may be so proportioned that the voltage at which operating magnet 7 causes contacts 10 to close will be substantially the same as the voltage at which this magnet again causes the contacts 10 to open.

A typical specific example of the operation of the embodiment of Fig. 1 is as follows. Suppose that it is desire to hold the voltage of battery 4 between the limits of 127 volts and 131 volts. Coil 7 will be so designed that at 127 volts it will operate to close contacts 10. Coil 9 will be so designed that when 131 volts is attained it will operate to close contacts 12 and open contacts 8. This will connect the artificial load 13 across the circuit which will then cause the voltage of battery 4 to fall. It will also connect resistance 11 in series with the operating winding 7 and this resistance will be so proportioned that at 127 volts operating coil 7 will cause contacts 10 to open thus deenergizing operating winding 9 and removing the artificial load 13 from the circuit. In actual practice the high and low voltage limits between which the battery is held may be as close together or as far apart as desired.

The embodiment of my invention illustrated in Fig. 2 differs from that illustrated in Fig. 1 in that the normally open contacts 12 which are controlled by the operating winding 9 are replaced by normally closed contacts 14 which are connected so as to short circuit a current limiting device, such as a resistance 15, which is in the control circuit between the storage battery and the source of charging current.

The operation of this embodiment is as follows. Upon the occurrence of the predetermined high voltage operating coil 9 will be energized as in Fig. 1 thereby to open contacts 14 with the result that the resistance 15 is inserted in the control circuit. This insertion of additional resistance in the control circuit causes an increased voltage drop between the battery and the charging source thereby reducing the charging rate of the battery. When the predetermined low voltage is attained, operating winding 9 will be deenergized thereby allowing contacts 14 to close and short circuit resistance 15 thus restoring the regulating arrangement to its initial position as shown in the drawing.

While I have shown and described particular embodiments of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a source of direct current, a storage battery connected to be charged from said source, a battery voltage responsive relay having means for reducing the charging rate of the battery when the battery voltage has a predetermined high value, and a second battery voltage responsive relay having means for causing said first mentioned relay to increase the charging rate of the battery when the battery voltage has a predetermined low value.

2. In combination, a direct current source, a storage battery connected to be charged from said source, a pair of electrically interlocked relays, one of said relays being responsive to the battery voltage and having means for connecting the second relay to respond to the battery voltage when a certain predetermined battery voltage is attained, said second relay having means for both reducing the charging rate of said battery and for varying the energizing connections of said first relay when the battery voltage attains a predetermined maximum value.

3. In combination, a source of direct current, a variable load connected thereto, a storage battery connected to be charged from said source, a pair of electrically interlocked relays, one of said relays being connected to respond to the battery voltage through a pair of contacts on the second relay which remain closed until the second relay is actuated, the first relay being arranged to be actuated when the battery voltage reaches a predetermined value, a current limiting device connected in parallel with the contacts of the second relay, the first relay having a pair of contacts for connecting the second relay to respond to the battery voltage when the first relay is actuated, the second relay being arranged to be actuated by a higher battery voltage than the voltage at which the first relay is actuated, and additional contacts on the second relay for controlling the charging rate of the battery.

4. In combination, a source of direct current, a variable load connected thereto, a storage battery connected to be charged from said source, a pair of electrically interlocked relays, one of said relays being connected to respond to the battery voltage through a pair of contacts on the second relay which remain closed until the second relay is actuated, the first relay being arranged to be actuated when the battery voltage reaches a predetermined value, a current limiting device connected in parallel with the contacts of the second relay, the first relay having a pair of contacts for connecting the second relay to respond to the battery voltage when the first relay is actuated, the second relay being arranged to be actuated by a higher battery voltage than the voltage at which the first relay is actuated, an artificial load, and additional contacts on the second relay for controlling the connection of said artificial load to said source.

5. In combination, a source of direct current, a variable load connected thereto, a storage battery connected to be charged from said source, a pair of electrically interlocked relays, one of said relays being connected to respond to the battery voltage through a pair of contacts on the second relay which remain closed until the second relay is actuated, the first relay being arranged to be actuated when the battery voltage reaches a predetermined value, a current limiting device connected in parallel with the contacts of the second relay, the first relay having a pair of contacts for connecting the second relay to respond to the battery voltage when the first relay is actuated, the second relay being arranged to be actuated by a higher battery voltage than the voltage at which the first relay is actuated, an artificial load, and additional contacts on the second relay for connecting said artificial load to said source when the second relay is actuated.

6. In combination, a source of direct current, a variable load connected thereto, a storage battery connected to be charged from said source, a pair of electrically interlocked relays, one of said relays being connected to respond to the battery voltage through a pair of contacts on the second relay which remain closed until the second relay is actuated, the first relay being arranged to be actuated when the battery voltage reaches a predetermined value, a current limiting device connected in parallel with the contacts of the second relay, the first relay having a pair of contacts for connecting the second relay to respond to the battery voltage when the first relay is actuated, the second relay being arranged to be actuated by a higher battery voltage than the voltage at which the first relay is actuated, a current limiting device connected between said source and said battery, and additional contacts on the second relay for short circuiting said last mentioned current limiting device when the second relay is not actuated.

In witness whereof, I have hereunto set my hand this 30th day of December, 1930.

JAMES H. OLIVER.